US006529545B2

(12) United States Patent
Tiirola et al.

(10) Patent No.: US 6,529,545 B2
(45) Date of Patent: Mar. 4, 2003

(54) RAKE RECEIVER

(75) Inventors: Esa Tiirola, Oulu (FI); Juha Ylitalo, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/821,931

(22) Filed: Mar. 30, 2001

(65) Prior Publication Data
US 2001/0017883 A1 Aug. 30, 2001

Related U.S. Application Data

(63) Continuation of application No. PCT/FI99/00984, filed on Nov. 26, 1999.

(51) Int. Cl.[7] .............................................. H04B 1/707
(52) U.S. Cl. ....................................... 375/148; 375/144
(58) Field of Search ................................. 375/140, 144, 375/148, 150, 152; 370/335, 342

(56) References Cited

U.S. PATENT DOCUMENTS

| 5,652,765 | A | * | 7/1997 | Adachi et al. ............... 375/211 |
| 5,680,419 | A | | 10/1997 | Bottomley |
| 5,809,020 | A | * | 9/1998 | Bruckert et al. ............. 370/335 |
| 5,999,560 | A | * | 12/1999 | Ono ........................... 375/148 |
| 6,058,138 | A | * | 5/2000 | Fukumasa et al. .......... 375/130 |
| 6,137,788 | A | * | 10/2000 | Sawahashi et al. ......... 370/342 |
| 6,215,814 | B1 | * | 4/2001 | Ylitalo et al. ............... 375/148 |
| 6,222,498 | B1 | * | 4/2001 | Ishii et al. .................. 343/853 |

FOREIGN PATENT DOCUMENTS

| WO | WO 94/28640 | 12/1994 |
| WO | WO 99/35763 | 7/1999 |
| WO | WO 00/16494 | 3/2000 |

OTHER PUBLICATIONS

Verdu, "Adaptive Multiuser Detection", *IEEE ISSSTA '94 Proceedings of the IEEE Third International Symposium on Spread Spectrum Techniques and Applications*, ISBN 07803–1750–5, pp. 43–50.
International Search Report for PCT/FI99/00984.

* cited by examiner

*Primary Examiner*—Young T. Tse
(74) *Attorney, Agent, or Firm*—Altera Law Group, LLC

(57) ABSTRACT

The invention relates to a Rake receiver of a CDMA system using IRC. The Rake receiver comprises at least two antenna branches, at least one Rake finger, and a delay estimator. The delay estimator comprises a despreader and an allocator for selecting at least one delay, and allocating a Rake finger for processing the signal component found by informing the Rake finger of the delay found. The delay estimator further comprises: a channel estimator, an interference estimator for generating an interference signal, a weighting coefficient part for providing each antenna branch with weighting coefficients maximizing the Signal-to-Interference-and-Noise Ratio, a multiplier for multiplying the pilot part by a weighting coefficient, and an antenna branch summer for combining the despread pilot parts, received via the separate antenna branches and multiplied by the weighting coefficient, to one combined pilot signal, on which combined pilot signal the selection is based in the allocator.

24 Claims, 10 Drawing Sheets

RAKE RECEIVER

This Application is a continuation of international Application Ser. No. PCT/FI99/00984, filed on Nov. 26, 1999.

FIELD OF THE INVENTION

The invention relates to a Rake receiver of a radio system using a Code Division Multiple Access (CDMA) method.

DESCRIPTION OF THE BACKGROUND ART

In radio systems, diversity methods of different kinds are used for increasing the coverage area and/or capacity of the system. As to this publication, space diversity, i.e. antenna diversity, polarization diversity and multipath diversity are of interest. Space diversity indicates that antennas are positioned sufficiently far from each other to achieve a sufficient decorrelation between signals received via the separate antennas. An interesting kind of polarization diversity is implicit polarization, i.e. a signal is sent on one polarization level, but received by cross-polarized antennas. Multipath diversity refers to diversity created by multipath propagated signal components, this diversity being usable in a system, such as a CDMA system, in which the bandwidth of a signal is much wider than the coherent bandwidth of a channel.

In a CDMA system, a Rake receiver is used for separating multipath propagated signal components at reception. In general, the signal components must then be separated from each other by at least one chip of a spreading code used. The Rake receiver comprises Rake fingers and, in each of these fingers, despreading and diversity combination take place. In addition, the receiver comprises a delay estimator having a matched filter for each antenna branch and an allocation block for the Rake fingers. In the matched filter, a signal, received by a spreading code used for signal spreading, is correlated by different delays, the timing of the spreading code then being changed for instance in steps of one chip. When the correlation is high, a multipath propagated signal component is found and it can then be received at the delay found.

On the radio path, the signal will include not only the desired signal but also noise and interference caused by other users or systems. In systems utilizing diversity, the influence of noise and interference can be decreased for instance by the Maximal Ratio Combining (MRC) method, in which signals received via separate antennas are weighted in proportion to the signal power in the separate antenna branches. However, this method presupposes that the interference of each antenna is independent. This presupposition is not always true in actual cellular radio networks, but it is conceivable that the same interference is present at each antenna.

There is no such restriction on the Interference Rejection Combining (IRC) method. However, the method has been used only in systems utilizing the Time Division Multiple Access (TDMA) method, these systems often being incapable of separating multipath propagated signal components. Herein, an IRC method refers to adaptive beam formation (optimal combination of signals), by which signal power is maximized in proportion to the power of interference and noise, i.e. the Signal-to-Interference-and-Noise Ratio (SINR) is maximized. Now we shall concentrate on the code acquisition block, or delay estimator, of the receiver. It consists of L matched filters and an allocator for Rake finger allocation. The task of the matched filters is to match the spread and scrambled pilot sequence to the complex conjugated antenna signal in order to resolve the delays of the channel impulse response taps. In the Rake finger allocation, the temporal Rake fingers are allocated for the different multipath components of the received signal.

The matched filters can also be implemented as a bank of parallel correlators which carry out the correlation function of the complex conjugated spreading sequence. Each correlator performs despreading procedure which, mathematically, is the calculation of the cross-correlation function between the received signal and the cophasal complex conjugated spreading sequence.

The outputs of the correlators are used for allocating the Rake fingers to demodulate the strongest multipath components of the received signal. The current method of Rake finger allocation is based on the energy of despread pilot symbols from L antennas. The outputs of despreaders are summed up at each code phase and N temporal Rake fingers are allocated according to the strongest energy of the sum signal. In the WCDMA (Wideband CDMA) concept the delay is estimated from the dedicated physical control channel (DPCCH). The result is averaged over several time slots to get improved estimates for the Rake finger allocation process.

The current Rake finger allocation is optimal in a spatially white interference scenario, in which the interference sources are evenly distributed in the angular domain. In a spatially coloured interference field, a high-powered interference source can decrease the performance of the receiver because the Rake fingers are allocated to the wrong chip delays.

BRIEF DESCRIPTION OF THE INVENTION

The present invention seeks to provide an improved Rake receiver. According to an aspect of the present invention, there is provided a Rake receiver as specified in claim 1. The preferred embodiments of the invention are claimed in the dependent claims.

The presented optimum combining scheme is capable of placing nulls towards interfering signals. Owing to this, the interference can be suppressed in Rake finger allocation. The number of the wrong Rake finger allocations can therefore be decreased, which improves the performance of the receiver. The receiver can also better track the changing interference field, and the spatial properties of interference field are taken into account in delay estimation.

LIST OF THE DRAWINGS

Embodiments of the present invention are described below, by way of example only, with reference to the attached drawings, in which FIGS. 1A and 1B illustrate a mobile telephone system;

DESCRIPTION OF THE EMBODIMENTS

In the following examples, embodiments of the invention are described in the Universal Mobile Telephone System (UMTS) without restricting the invention to it.

Figure 1A:
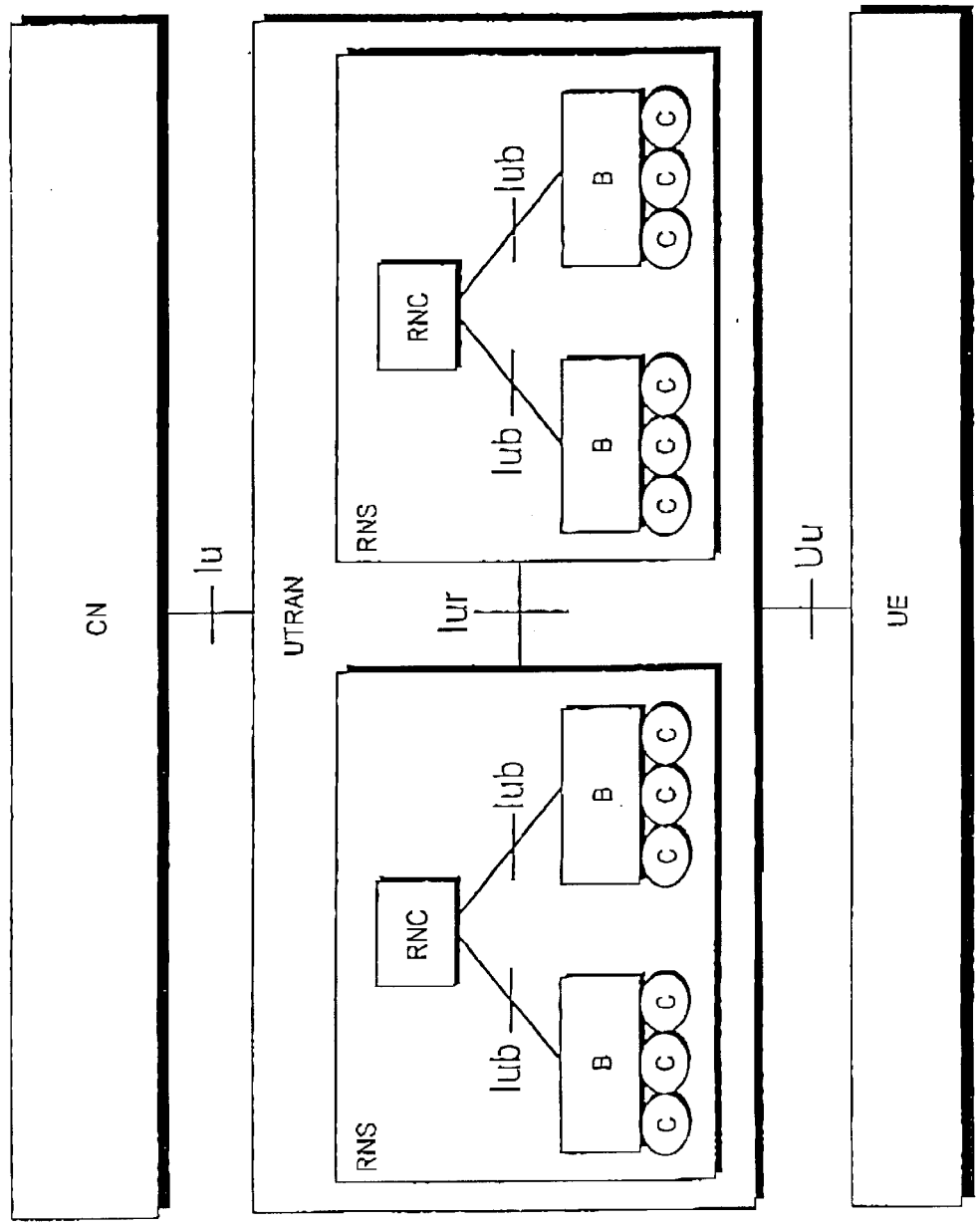
Figure 1B:
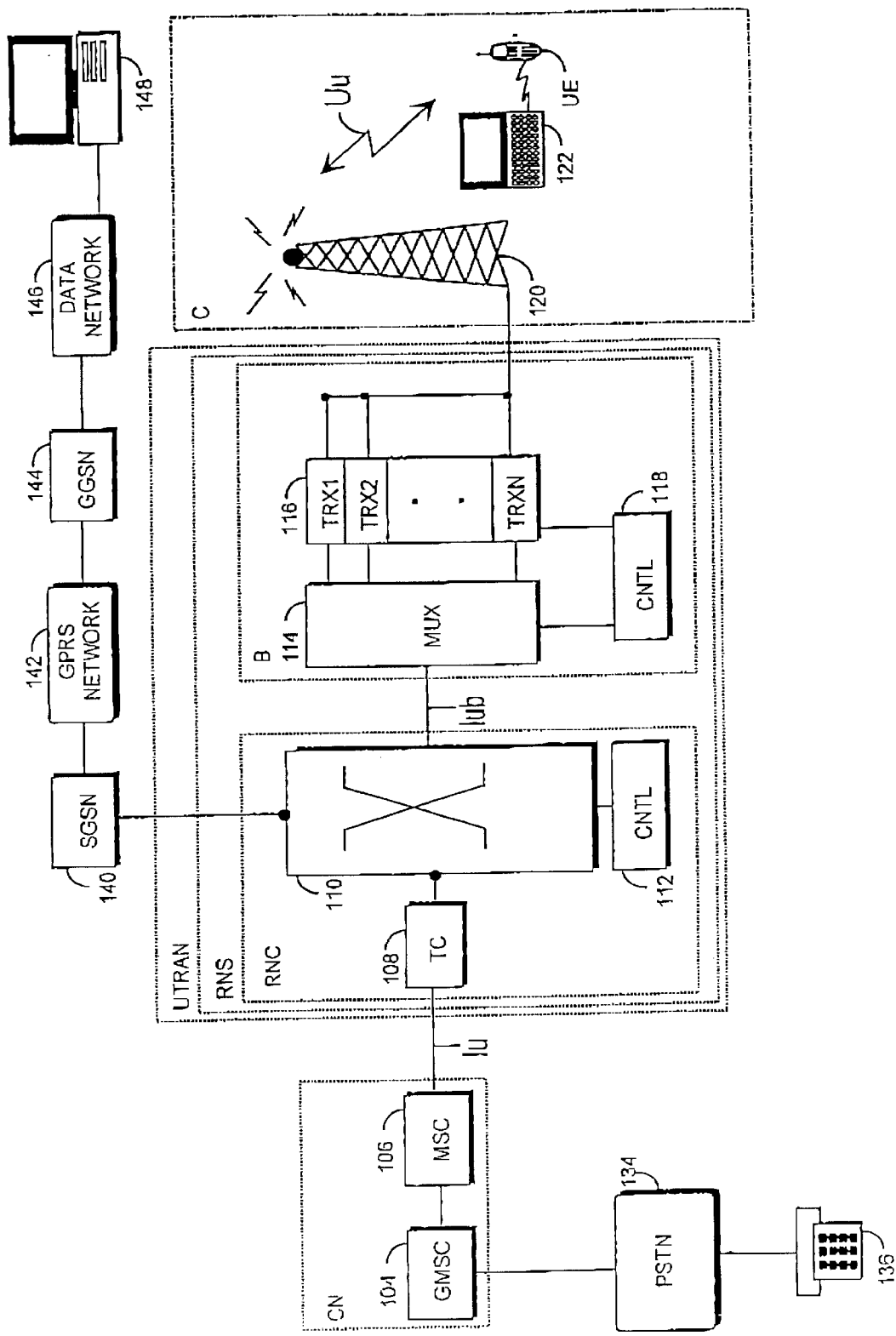

The structure of a universal mobile telephone system is explained referring to FIGS. 1A and 1B. FIG. 1B comprises only the blocks that are essential for the description of the invention, but it is obvious to one skilled in the art that a conventional mobile telephone system also comprises other functions and structures, which need not be explained here in more detail. The main parts of a mobile telephone system are a Core Network CN, a UMTS terrestrial radio access network UTRAN and User Equipment UE. The interface between the CN and the UTRAN is called Iu and the air interface between the UTRAN and the UE is called Uu.

The UTRAN comprises Radio Network Subsystems RNS. The interface between the RNSs is called Iur. An RNS comprises a Radio Network Controller RNC and one or more nodes B. The interface between the RNC and B is called Iub. The coverage area of node B, i.e. a cell, is denoted by C in FIG. 1B.

The description in FIG. 1A is very abstract, and it is therefore clarified in FIG. 1B, which shows the parts of the GSM system that approximately correspond to the parts of the UMTS. It should be noted that the mapping presented is not in any way binding, but indicative, because the responsibilities and functions of the various parts of the UMTS are still under development.

In accordance with FIG. 1B, a circuit-switched connection can be established from the user equipment UE to a telephone 136 connected to a Public Switched Telephone Network (PSTN) 134. The user equipment UE can be for instance a fixed terminal, a terminal positioned in a vehicle or a portable terminal. The radio network infrastructure UTRAN comprises radio network subsystems RNS, i.e. base station systems. The radio network subsystem RNS comprises a radio network controller RNC, i.e. a base station controller, and at least one node B, i.e. a base station, controlled by that controller.

A base station B comprises a multiplexer 114, transceivers 116 and a control unit 118 controlling the operation of the transceivers 116 and the multiplexer 114. Traffic and control channels used by a plurality of transceivers 116 are positioned on a transmission link Iub by the multiplexer 114.

From the transceivers 116 of the base station B, there is a connection to an antenna unit 120 implementing a bi-directional radio connection Uu to the user equipment UE. The structure of the frames to be transmitted on the bidirectional radio connection Uu is accurately defined.

The base station controller RNS comprises a switching network 110 and a control unit 112. The switching network 110 is used for connecting speech and data and for combining signalling circuits. The base station system, comprising the base station B and the base station controller RNC, additionally comprises a transcoder 108. The division of tasks between the base station controller RNC and the base station B and the physical structure thereof may vary according to the implementation. The base station B typically attends to the implementation of the radio path in the above-described manner. The base station controller RNC typically controls things as follows: radio resources, handover between cells, power control, timing and synchronization, paging of user equipment.

The transcoder 108 is generally situated as close to a mobile phone exchange 106 as possible, because speech can then be transmitted in the form of a mobile phone system between the transcoder 108 and the base station controller RNC, thus by saving transmission capacity. The transcoder 108 converts the various digital speech coding forms between the public switched telephone network and the radio telephone network into a compatible format, for instance from a 64 kbit/s format of a fixed network to another (for instance 13 kbit/s) format of the cellular radio network and vice versa. The devices required are not described here any further, but it can be stated that no other data than speech is converted by the transcoder 108. The control unit 112 performs call control and mobility management, collects statistic data and performs signalling.

A core network CN consists of an infrastructure belonging to a mobile telephone system outside the UTRAN. Of the devices of the core network CN, FIG. 1B illustrates the mobile phone exchange 106 and a gateway mobile phone exchange 104 which attends to the connections of the mobile phone system to the outside world, here to the public switched telephone network 102.

Figure 4:
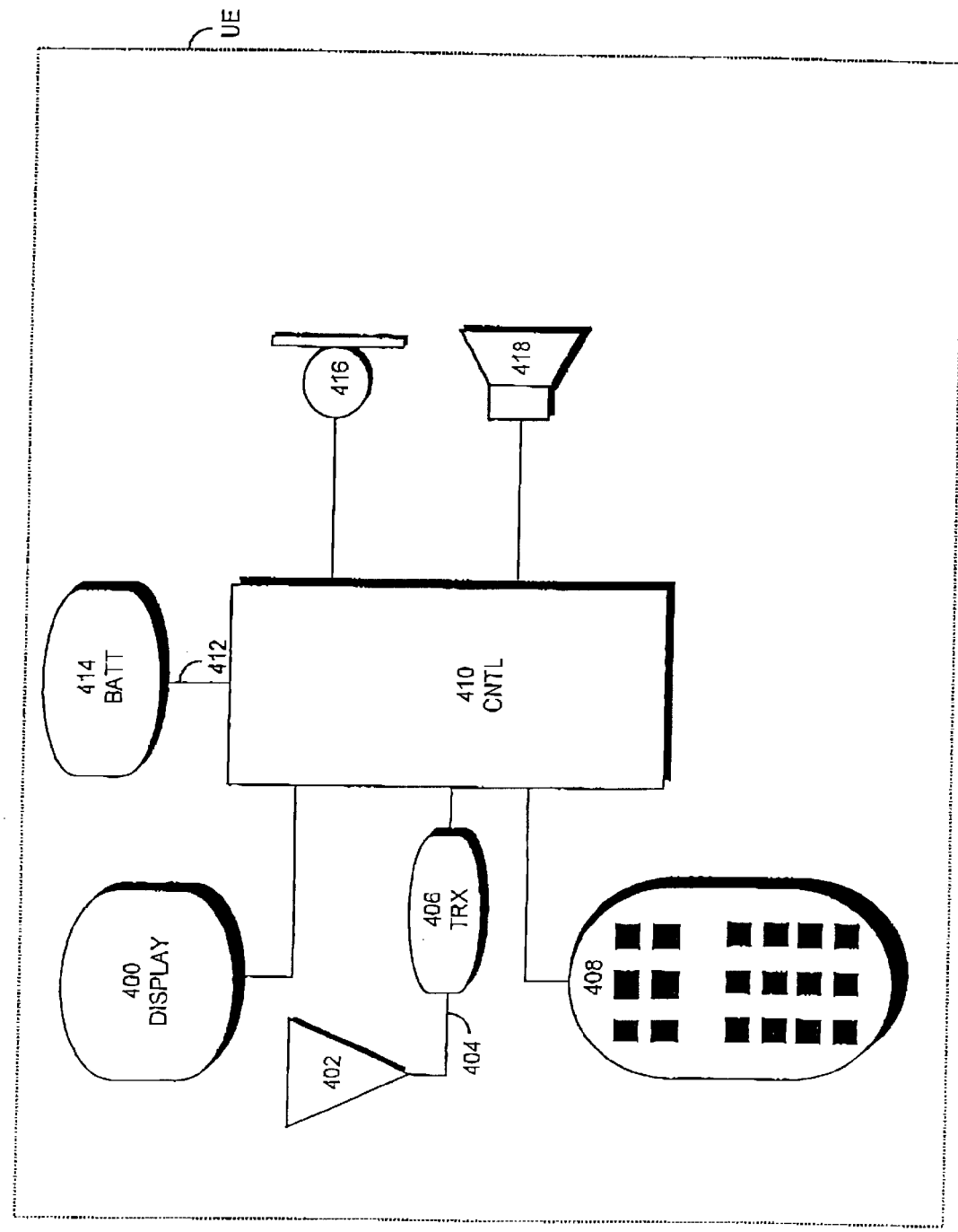
FIG. 4 illustrates the structure of user equipment in a simplified manner.

FIG. 4 shows an example of the structure of the user equipment UE. The substantial parts of the user equipment UE are: an interface 404 for an antenna 402 of the user equipment, a transceiver 406, a control part 410 of the user equipment and an interface 412 for a battery 414. A user interface generally comprises a display 400, a keyboard 408, a microphone 416 and a loudspeaker 418. The user equipment may be for instance a portable mobile phone, a phone to be positioned in a car, a terminal of wireless local loop or data transmission equipment integrated into a computer.

The system can also employ packet-switched transmission equipment, such as the GPRS (General Packet Radio Service). The GPRS (General Packet Radio Service) is a service in which air interface capacity not used in circuit-switching is employed for packet transmission. As the GPRS is a GSM-based emerging service, no details on the adaptation thereof to the UMTS will be given.

As FIG. 1B shows, the switching field 110 can perform switching (depicted by black spots) to a public switched telephone network (PSTN) 134 through the mobile services switching centre 106 and to a packet transmission network 142. A typical terminal 136 in the public switched telephone network 134 is an ordinary or an ISDN (Integrated Services Digital Network) phone.

The connection between the packet transmission network 142 and the switching field 110 is established by a support node (SGSN=Serving GPRS Support Node) 140. The aim of the support node 140 is to transfer packets between the base station system and a gateway node (GGSN=Gateway GPRS Support Node) 144, and to keep record of the location of the subscriber terminal UE within its area.

The gateway node 144 connects the packet transmission network 142 and a public packet transmission network 146. An Internet protocol or an X.25 protocol can be used at the interface. By encapsulation, the gateway node 144 hides the internal structure of the packet transmission network 142 from the public packet transmission network 146, so for the public packet transmission network 146 the packet transmission network 142 resembles a sub-network, the public packet transmission network being able to address packets to the subscriber terminal UE placed therein and to receive packets therefrom.

The packet transmission network 142 is typically a private network which uses an Internet protocol carrying signalling and user data. As regards the architecture and protocols below the Internet protocol layer, the structure of the network 142 may vary operator-specifically.

The public packet transmission network 146 may be for example a global Internet to which a terminal 148, for example a server computer, with a connection thereto wants to transfer packets to the subscriber terminal UE.

Figure 2A:
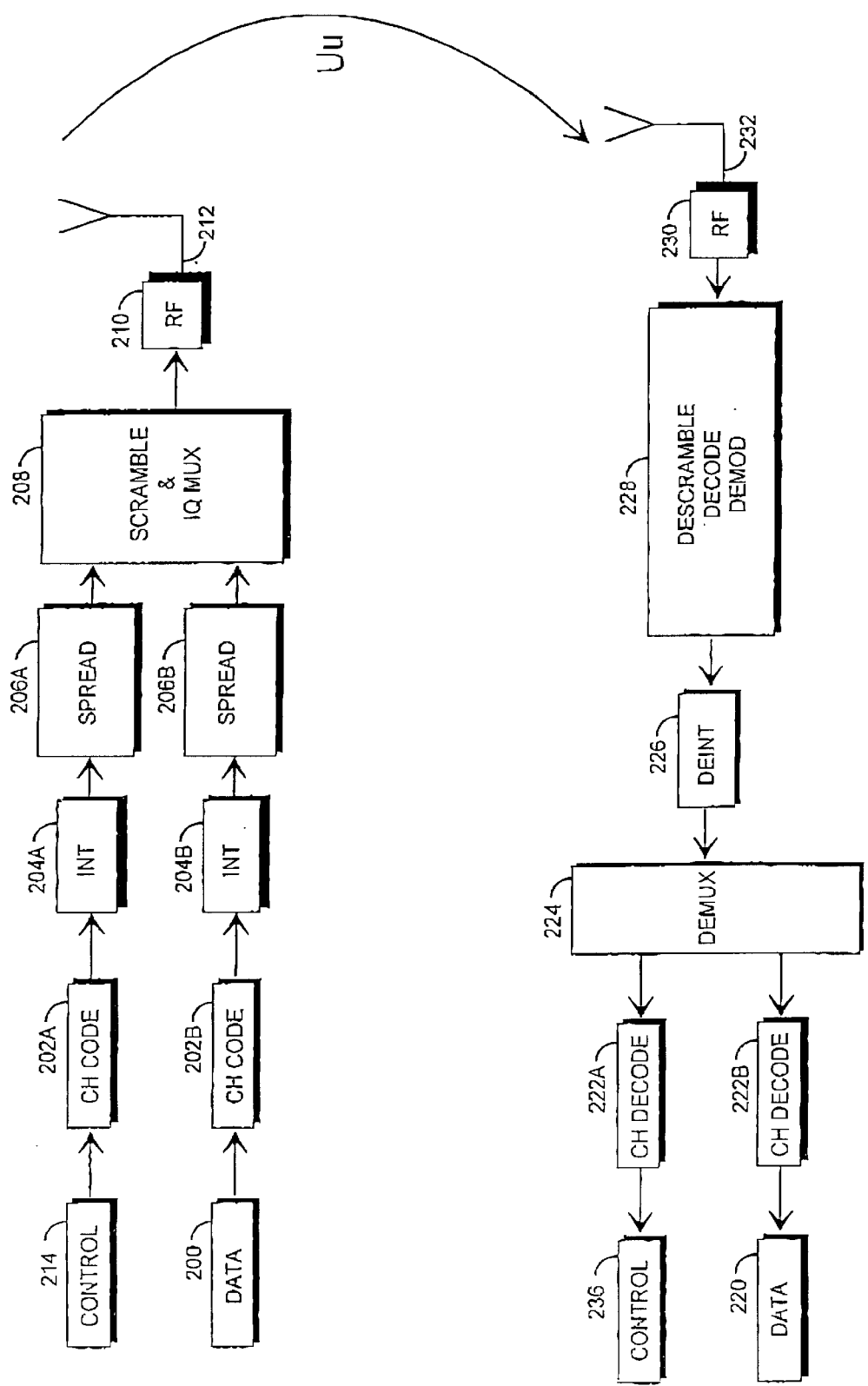
FIG. 2A shows a transmitter and a receiver of a mobile telephone system.

FIG. 2A illustrates the function of a pair of radio transceivers. A radio transmitter may be located in a node B or in the user equipment UE and a radio receiver in the user equipment UE or in the node B.

The upper part of FIG. 2A shows the essential functions of a radio transmitter. Various services to be located on a physical channel are for instance speech, data, moving or stopped video image and system control channels. The figure illustrates a control channel and data processing. The various services require various source coding means; speech, for instance, requires a speech codec. However, for the sake of clarity, the source coding means are not shown in FIG. 2A.

Pilot bits used by the receiver for channel estimation are also located on the control channel 214. User data 200 is located on the data channel.

The various channels are then channel-coded in various ways in blocks 202A and 202B. Channel coding comprises for instance different block codes, an example of them being Cyclic Redundancy Check (CRC). In addition, convolution coding and its various modifications, such as punctured convolution coding or turbo coding, are typically used. Said pilot bits are not channel-coded, however, because the intention is to find out the signal distortions caused by the channel.

After the various channels have been channel-coded, they are interleaved in an interleaver 204A, 204B. The aim of interleaving is to facilitate error correction. At interleaving, the bits of the various services are scrambled together in a predetermined way, whereby an instantaneous fading on the radio path alone does not necessarily make the information transmitted unfit for identification. Subsequently, the interleaved bits are spread by a spreading code in blocks 206A, 206B. The chips obtained are then scrambled by a scrambling code and modulated in block 208, the operation of which is described in more detail in FIG. 2B. In this way, the separate signals are combined in block 208 to be transmitted via the same transmitter.

Finally, the combined signal is brought to radio frequency parts 210, which may comprise different power amplifiers and bandwidth restricting filters. Regulation of a closed loop used for transmission power control generally controls a transmission power control amplifier located in this block. An analog radio signal is then sent via the antenna 202 to the radio path Uu.

The lower part of FIG. 2A illustrates the essential functions of a radio receiver. The radio receiver is typically a Rake receiver. An analog radio frequency signal is received from the radio path Uu by an antenna 232. The signal is brought to radio frequency parts 230 comprising a filter, which suppresses frequencies outside the desired frequency band.

Subsequently, the signal is converted in block 228 to an intermediate frequency or directly to baseband, in which form the signal is sampled and quantized. Because the signal is a multipath propagated signal, the intention is to combine the signal components propagated along different paths in block 228, the block comprising the actual Rake fingers of the receiver according to the prior art technique. Block 228 is described in more detail in FIG. 2C.

The physical channel obtained is then deinterleaved in a deinterleaver 226. Subsequently, the deinterleaved physical channel is divided into data streams of different channels in a demultiplexer 224. Each channel is brought to a separate channel decoding block 222A, 222B, where the channel coding used for a transmission, such as block coding and convolution coding, is decoded. Convolution coding is decoded preferably by a Viterbi decoder. Each transmitted channel 220A, 220B can then be brought to be further processed, as needed, for instance data 220 is brought to a computer 122 connected to the user equipment UE. The control channels of the system are brought to a control part 236 of the radio receiver.

Figure 2B:
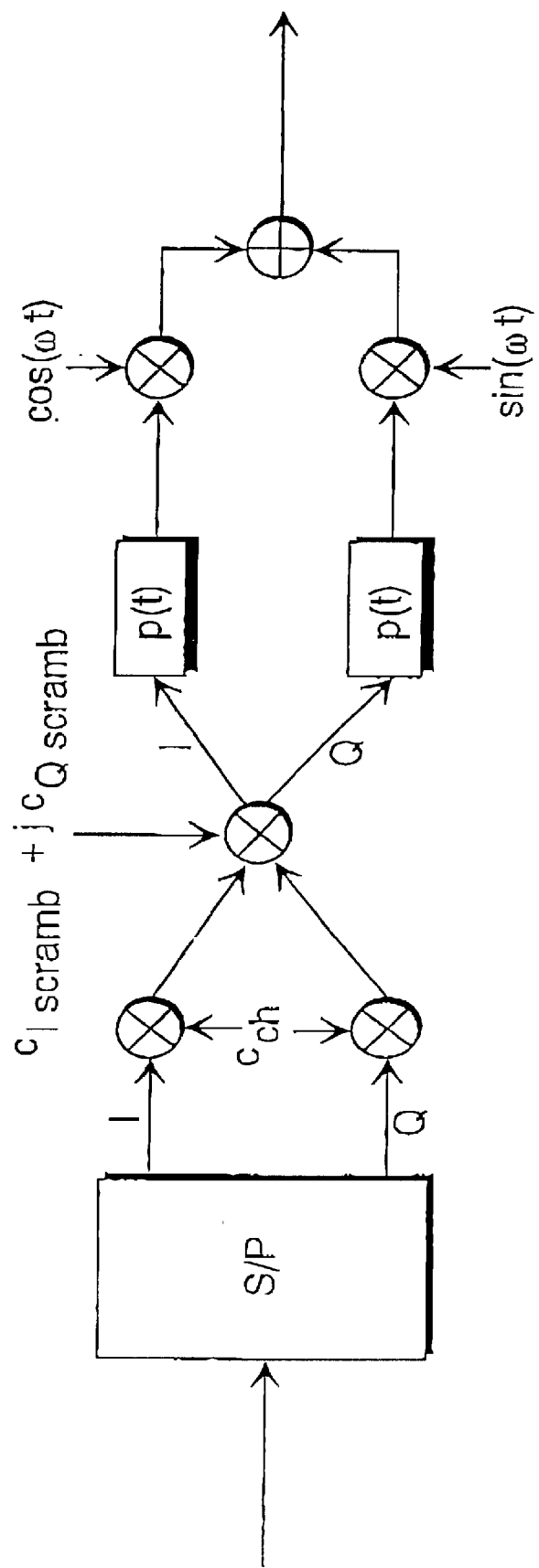
FIG. 2B illustrates spreading and modulation in a transmitter.

FIG. 2B illustrates in more detail how a channel is spread by a spreading code and modulated. To the left in the figure, a bit stream of the channel arrives at block SIP, where each two-bit sequence is converted from series form to parallel form, which means that one bit is brought to branch I of the signal and the other one to branch Q of the signal. Subsequently, the signal branches I and Q are multiplied by a spreading code $c_{ch}$, whereby relatively narrow-band information is spread to a wide frequency band. Each branch can have the same or a different spreading code. Each connection Uu has a separate spreading code or separate spreading codes, by which the receiver identifies the transmissions intended for it. Then the signal is scrambled by multiplication with a scrambling code $c_{I\ scramb} + j\ c_{Q\ scramb}$, which is separate for each transmitter. The pulse form of the obtained signal is filtered by filters p(t). Finally, the signal is modulated to a radio frequency carrier by multiplying its separate branches shifted from each other by 90 degrees, the branches thus obtained are combined to one carrier ready to be sent to the radio path Uu, excluding possible filterings and power amplifications. The modulation mode described is Quadrature Phase Shift Keying QPSK.

Instead of the described I/Q multiplexing, time multiplexing can also be used, where data and control channels are positioned sequentially on the time axis. However, the time difference between the channels is then so small that an interference estimated from the control channel can be assumed to be the same also on the data channel.

Maximally, 256 different mutually orthogonal spreading codes can typically be -used simultaneously. For instance, if the UMTS uses a five megahertz carrier at the speed of 4.096 megachips per second in the downlink direction, the spreading factor 256 corresponds to the transmission speed of 32 kbit/s, and respectively, the highest practical transmission speed is achieved by spreading factor four, whereby the data transmission speed is 2048 kbit/s. Accordingly, the transmission speed on the channel varies stepwise from 32, 64,128, 256, 512,1024 to 2048 kbit/s, the spreading factor being 256, 128, 64, 32, 16, 8 and 4, respectively. The data transmission speed at the user's disposal depends on the channel coding used. For instance, if ⅓ convolution coding is used, the user's data transmission speed is about one third of the data transmission speed of the channel. The spreading factor informs the length of the spreading code. For instance, the spreading code corresponding to the spreading factor one is (1). The spreading factor two has two mutually orthogonal spreading codes (1,1) and (1,−1). Further, the spreading factor four has four mutually orthogonal spreading codes: below an upper level spreading code (1,1), there are spreading codes (1,1,1,1) and (1,1,−1,−1), and below another upper level spreading code (1,−1), there are spreading codes (1,−1,1,−1) and (1,−1,−1,1). The formation of spreading codes is continued in this way when propagating to lower levels of a code tree. The spreading codes of a given level are always mutually orthogonal. Likewise, a spreading code of a given level is orthogonal to all the spreading codes of another spreading code of the same level, which are derived from that other spreading code to next levels.

In transmission, one symbol is multiplied by a spreading code, whereby the data spreads over the frequency band to be used. For instance, when the spreading code 256 is used, one symbol is represented by 256 chips. Respectively, when the spreading code 16 is used, one symbol is represented by 16 chips.

Figure 3:
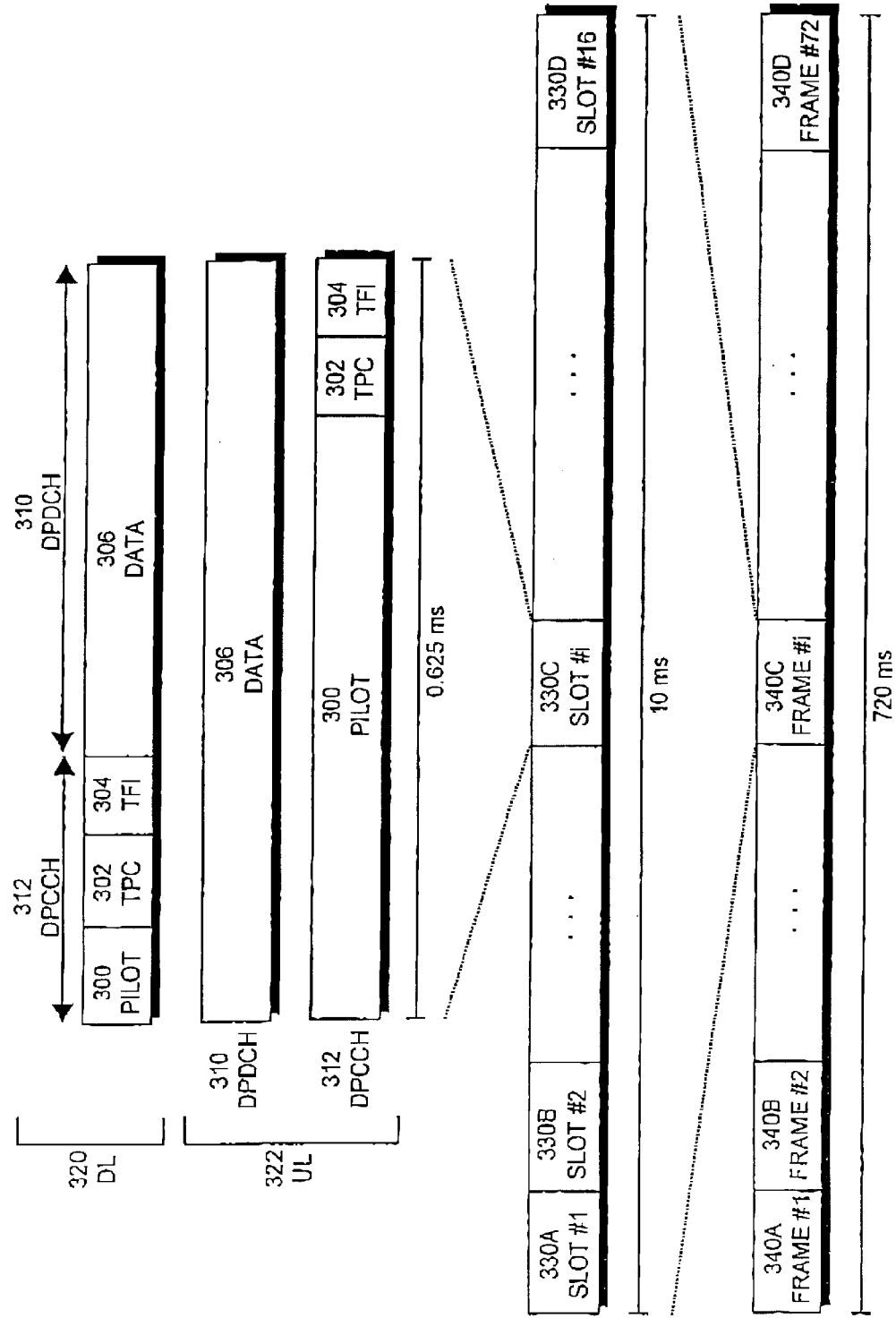
FIG. 3 illustrates channels of a mobile telephone system positioned in a frame.

FIG. 3 shows an example of which kind of frame structure can be used on a physical channel. Frames 340A, 340B, 340C, 340D are numbered consecutively from one to 72 and they form a 720 milliseconds long superframe. The length of one frame 340C is 10 milliseconds. The frame 340C is divided into sixteen slots 330A, 330B, 330C, 330D. The length of one slot 330C is 0.625 milliseconds. One slot 330C corresponds typically to one power control period, during which the power is controlled for instance by one decibel upwards or downwards.

The physical channels are divided into two different types: Dedicated Physical Data Channels (DPDCH) 310 and Dedicated Physical Control Channels (DPCCH) 312. The dedicated physical data channels 310 are used for transporting data 306 generated in layer two of Open Systems Interconnection (OSI) and above it, i.e. dedicated traffic channels, mainly. The dedicated physical control channels 312 transport control information generated in layer one of OSI. The control information comprises: a pilot part, i.e. pilot bits, 300 to be utilized for channel estimation, Transmit Power Control (TPC) commands 302 and, optionally, a Transport Format Indicator (TFI) 304. The transport format indicator 304 tells the receiver the transmission speed used at that moment by each dedicated physical data channel in the uplink direction.

As appears from FIG. 3, the dedicated physical data channels 310 and the dedicated physical control channels 312 are time-multiplexed into the same slot 330C in the downlink direction. In the uplink direction again, these channels are transmitted in parallel in such a way that they are IQ-multiplexed (I=Inphase, Q=Quadrature) into each frame 340C and transmitted by dual-channel Quadrature Phase Shift Keying (QPSK) modulation. When the intention is to transmit additional dedicated physical data channels 310, they are code-multiplexed either into branch I or Q of the first pair of channels.

Figure 2C:
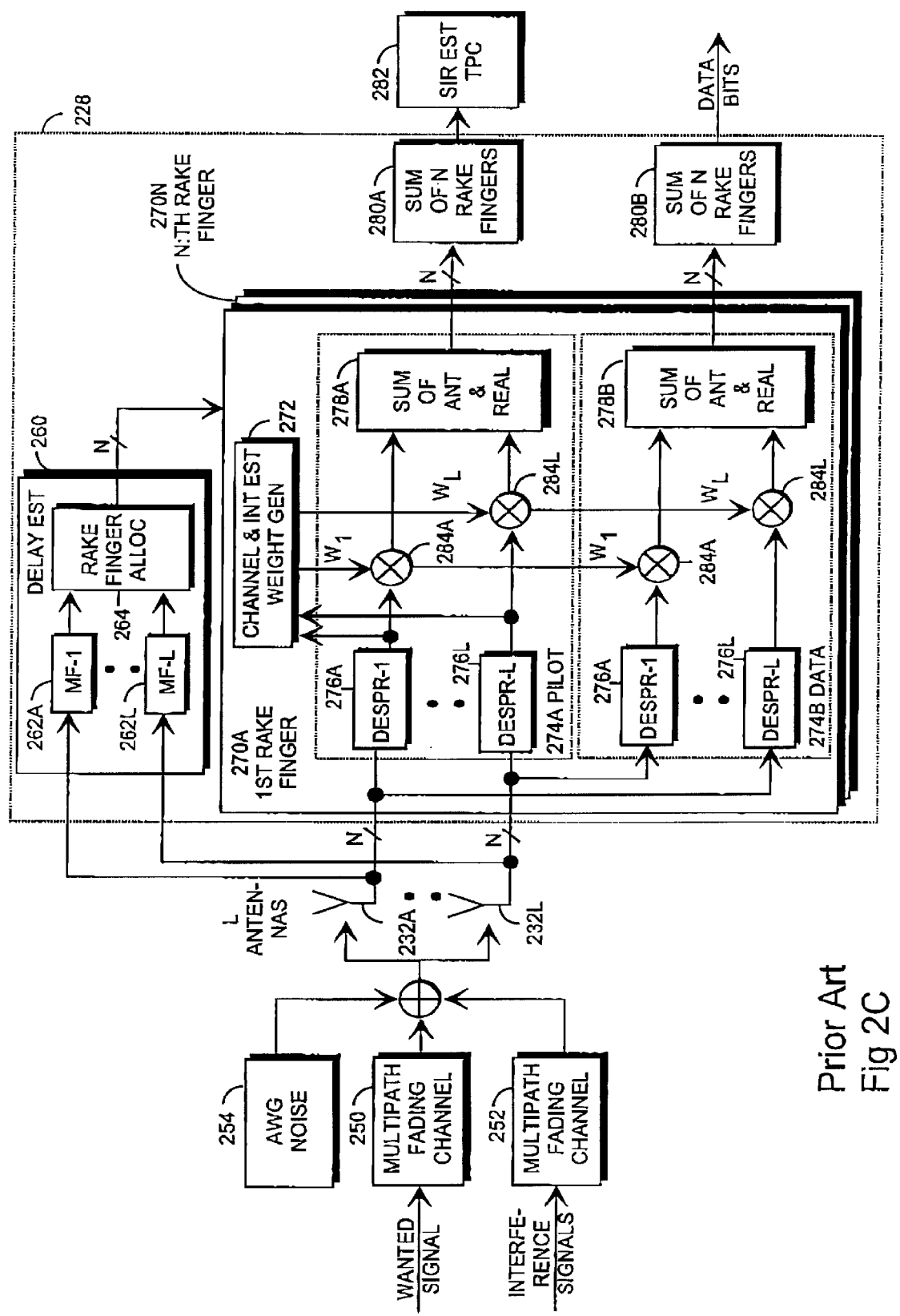
FIG. 2C illustrates a combined descrambling, decoding and demodulation block of the receiver of FIG. 2A.

Subsequently, FIG. 2C is examined, the figure illustrating in more detail the combined descrambling, decoding and demodulating block 228 of the receiver, shown in FIG. 2A. Descrambling is not described, however, because it is of no relevance to the invention. A desired radio signal, sent to the radio path Uu, multipath propagates on an occasionally fading channel 250. Further, additive zero mean white gaussian noise 254 is combined with the signal. Moreover, interfering signals, also multipath propagating on an occasionally fading channel 252, are combined with the signal.

Consequently, a signal to be received from the radio path Uu contains, not only the desired signal, but also both noise and interference. The signal is received by at least two separate antenna branches 232A, 232L. The branches 232A, 232L may form an antenna array to provide antenna gain, the separate antennas being relatively close to each other, at a distance of half a wavelength, for instance. Another possibility is that the branches 232A, 232L are diversity branches, the separate antennas being relatively far from each other, at a distance of 10 to 20 wavelengths, for instance. The diversity can be implemented as space or polarization diversity.

The example of Figure 2C illustrates the use of space diversity, the branches 232A, 232L being implemented as an adaptive antenna. The adap-tive antenna is implemented by antennas 232A, 232L positioned far enough from each other, via which antennas the multipath propagated signal is re-ceived.

The number of antennas may be L. The figure illustrates only two antennas, the first antenna 232A and the Lth antenna 232L. The two points between the antennas represent the existing antennas, but are not described for the sake of clarity. Generally, the number of antennas varies between two and eight.

In accordance with the invention, signals received via the separate antenna branches 232A, 232L are weighted in such a way that the influence of noise and interference can be minimized.

When diversity is used, the intention is to make the correlation between the branches as low as possible. Another way of implementing diversity is to use polarization diversity, whereby a signal is received by cross-polarized antennas. In theory, also hybrids are possible, which means that both space and polarization diversity may be used simultaneously. An example of a solution applicable to user equipment is a so-called patch antenna, which can be a plate of about a square inch in size, the plate having cross polarization planes. Another example is user equipment positioned in a vehicle, where an implementation of space diversity is also relatively easy.

A signal received from all L antenna branches 232A, 232L is brought via radio frequency parts (not shown in Figure 2C) to a delay estimator 260 connected to the antenna branch 232A, 232L. In the delay estimator 260, the delays of the best audible multipath propagated signal components are searched for. A Rake finger 270A, 270B is allocated for processing the found multipath propagated signal components. The delay estimator 260 informs each Rake branch 270A, 270B of the delay found.

The delay estimator 260 comprises a matched filter 262A, 262L for each antenna branch 232A, 232L. Thus, the number of matched filters 262A, 262L is also L. In the matched filter 262A, 262L, a predetermined number of parallel correlation calculations are performed for the received radio signal by different delays in order to estimate the delays of the multipath propagated signal components. In correlation calculation, the spread pilot part contained in the received radio signal is despread by a known spreading code using a pre-determined delay.

On the basis of the calculated correlations, an allocator 264 situated in the delay estimator selects at least one delay, by which a multipath propa-gated signal component is received. The allocator allocates a Rake finger 270A, 270B for processing the signal component found by informing the Rake finger of the delay found. To perform the selection, the correlation results of each matched filter 262A, 262L are typically combined in the allocator 264. If the correlation is high, a delay is found that represents the delay of the multi-path propagated signal component of the radio signal coming to the antenna branch 232A, 232L in question. In general, the strongest multipath compo-nents have the same code phases at all antennas, which is due to the vicinity of the antennas and to the fact that radio signals propagate at the speed of light.

As was said earlier, another known method for Rake finger allocation is based on the energy of despread pilot symbols from L antennas. The outputs of despreaders are summed up at each code phase and N temporal Rake fingers are allocated according to the strongest energy of the sum signal.

Figures 2D, 2E:
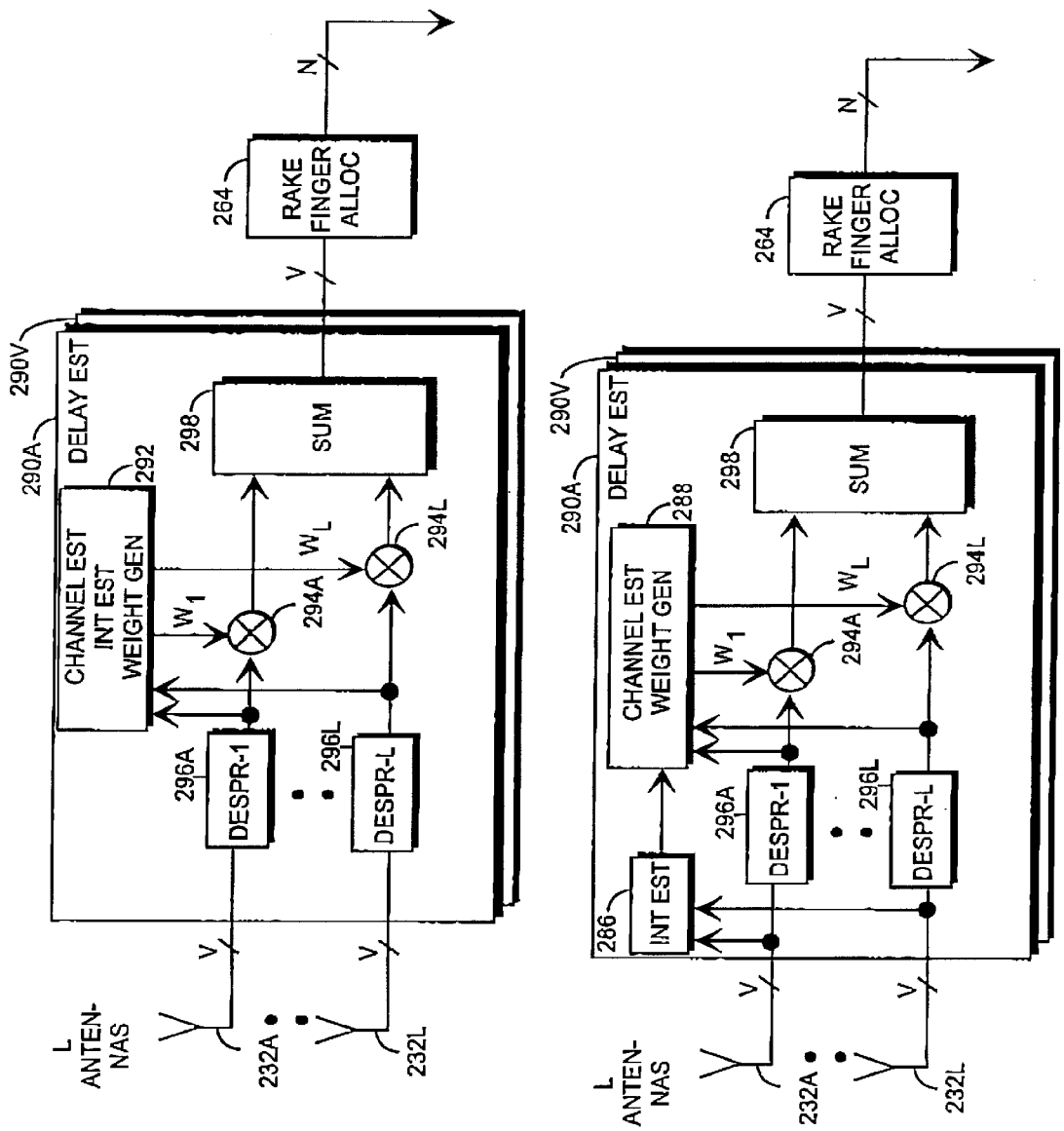
FIG. 2D illustrates an embodiment of the delay estimator.
FIG. 2E illustrates another embodiment of the delay estimator.
Figure 2F:
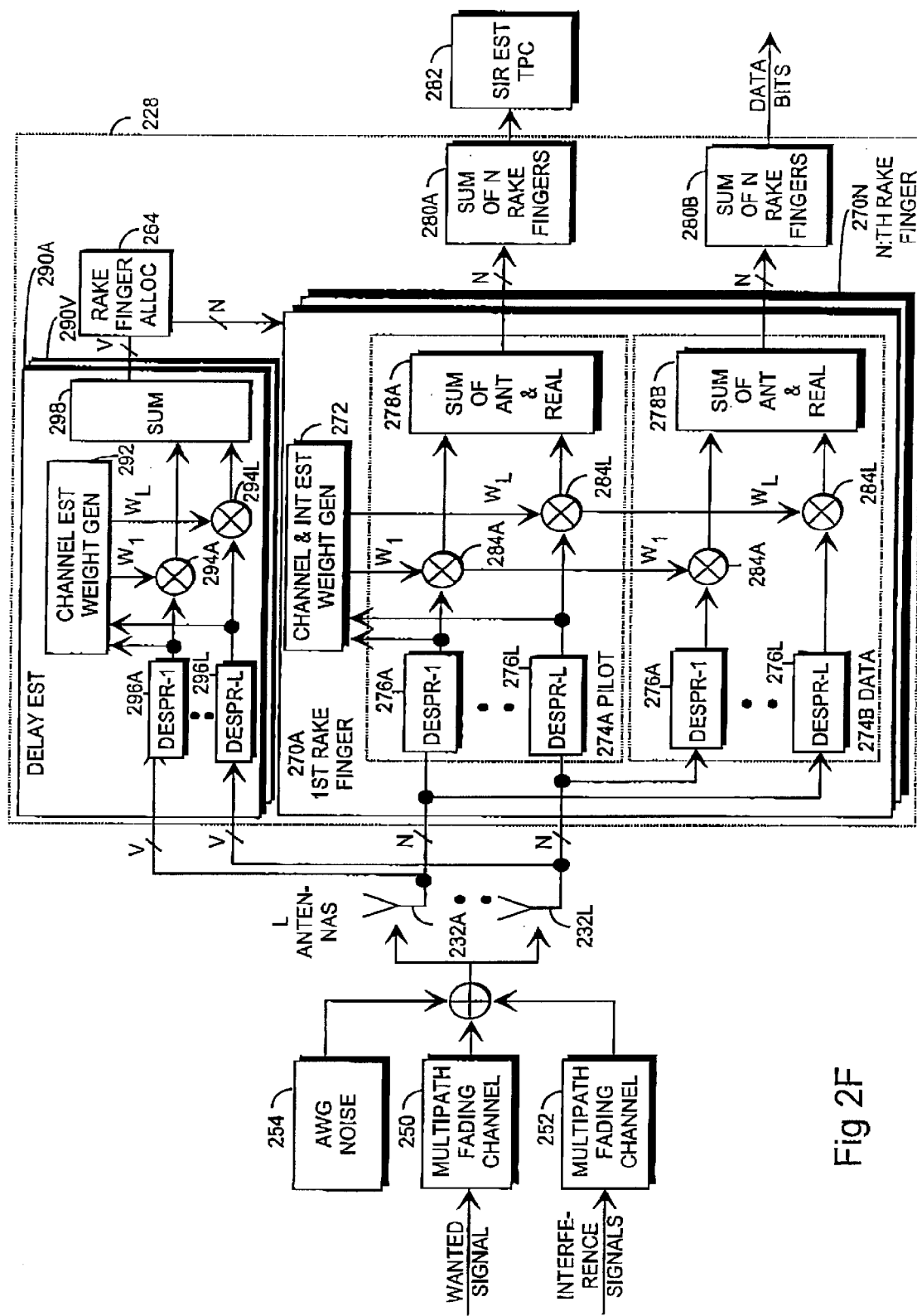
FIG. 2F illustrates an embodiment of the delay estimator presented in FIG. 2D as being included in the receiver presented in FIG. 2C.

FIG. 2D shows an embodiment of the delay estimator. One delay estimator 290A, 290V processes one multipath propagated signal component by a given code delay. The delay estimators 290A, 290V are described here as different instances for the sake of clarity, but they can also be realized as one instance operating internally in parallel. The delay estimator 290A, 290V comprises a channel estimator 292, by which a channel impulse response of a multipath propagated signal component, included in a radio signal and found by means of a known pilot part, i.e. practically complex impulse response taps of the channel, is generated.

In addition, the delay estimator 290A, 290B comprises an interfer-ence estimator 292, by which an interference signal, included in a radio signal of each antenna branch 232A, 232L and consisting of interference and noise, is generated. The interference signal can be generated by any means known to a person skilled in the art. In an embodiment the interference estimator 292 generates an interference signal by subtracting from the received radio signal a desired regenerated radio signal. In this embodiment the desired regener-ated radio signal is obtained by means of the known pilot part and the esti-mated impulse response of the chan-nel. For improved performance also deci-sion feedback of detected data bits included in the despread multipath propa-gated signal component can be employed in the estimation of the impulse response of the channel and the interference.

In another embodiment the interference estimator 292 generates the interference signal by using multi-user detection, whereby the signals of other users form the interference signal. More information on multiuser detection can be found in the following article: Verdu, Sergio: Adap-tive Multiuser detection, published in IEEE ISSSTA '94 Proceedings of the IEEE Third International Symposium on Spread Spectrum Techniques and Applications, ISBN 07803-1750-5, which is incorporated herein by reference.

The delay estimator 290A, 290V, comprises a despreader 296A, 296B, which is connected to each antenna branch 232A, 232L and despreads the spread pilot part included in the multipath propagated signal component, by a known spreading code at a delay.

There are L despreaders for processing the pilot part, i.e. one per each antenna branch 232A, 232L in each delay estimator 290A, 290L. In practice, when despreading, the pilot part of the signal component is multiplied by a complex conjugate of the spreading code in the right phase.

A weighting coefficient part 292 in the delay estimator 290A, 290L forms weighting coefficients maximizing the signal-to-interference-and-noise ratio (SINR) for each antenna branch 232A, 232L. This can be made for in-stance by multiplying an inverse matrix of a covariance matrix of an interfer-ence signal, consisting of interference and noise of the antenna branches 232A, 233L, by an estimated impulse response vector of the channel. The weighting coefficients are complex.

The pilot part despread by the despreader 296A, 296L in each antenna branch 232A, 232L is multiplied by the obtained weighting coefficients by using a multiplier 294A, 294L located in the delay estimator 290A, 290V.

An antenna branch summer 298, positioned last in the delay esti-mator 290A, 290V, combines the despread pilot parts, received via the sepa-rate antenna branches 232A, 232L and multiplied by a weighting coefficient, to one pilot signal.

As a whole, the situation is such that the delay estimator 290A, 290V allocates N Rake fingers 270A, 270B, for the best audible signal compo-nents. The outputs of the despreaders of different antenna branches are summed up at each code phase and N temporal Rake fingers are allocated according to the strongest energy of the sum signal.

On the basis of the energies of the formed pilot signals, an allocator 264 situated in the delay estimator selects at least one delay, by which a multipath propagated signal compo-nent is received. Instead of energy values power values or calculated correlation values may also be used. Pilot signals having the highest energies are selected. The allocator 264 allocates a Rake finger 270A, 270B for processing the signal component found by informing the Rake finger of the delay found. The number N may vary depending on the circumstances, or a threshold value may be set for the level of the multipath propagated signal component. Consequently, the search for timing is a dynamic process, and so is the allocation of the Rake fingers 270A, 270B to be combined.

In practice, a predetermined number of Rake fingers 270A, 270B, are allocated and/or a number required for delays exceeding a predetermined threshold value at corre-lation calculation. Generally, a limiting factor will be the maximum number of the Rake fingers 270A, 270B used. In this example, the number of allocated Rake fingers 270A, 270B is indicated by the letter N. The number of signal components depends on radio conditions and, for instance, on terrain shape and buildings causing reflections. In most cases, the smallest delay by which multipath propagated signal components are searched for is one chip. The fre-quency of Rake finger allocation can be variable. It can be performed for each slot or each frame, for example.

The functioning of the delay estimator 290A can be improved by three separate filter structures. These three solutions can be used alone or combined in any way. The impulse response of the channel generated by the channel estimator 292 is averaged coherently by a first filter structure connected to the channel estimator 292. The better channel estimate thus obtained also makes the weighting coefficients more reliable. The despread pilot part multiplied by the weighting coefficient is non-coherently filtered by a second filter structure connected between the multiplier 294A, 294L and the antenna branch summer 298 in each antenna branch 232A, 232L. This improves the result obtained in each antenna branch 232A, 232L. The combined pilot signal is averaged non-coherently by a third filter structure connected between the antenna branch summer 298 and the allocator 264.

One Rake finger 270A, 270B processes one multipath propagated signal component by a given code delay. The Rake finger 270A, 270B comprises a channel estimator 272, by which a channel impulse response of a multipath propa-gated signal component, included in a radio signal and found by means of a known pilot part, i.e. practically complex impulse response taps of the channel, is generated.

In addition, the Rake finger 270A, 270B comprises an interference estimator 272, by which an interference signal, included in a radio signal of each antenna branch 232A, 232L and consisting of interference and noise, is generated by subtracting from the received radio signal a desired regenerated radio signal. The desired regenerated radio signal is obtained by means of the known pilot part included in the radio signal and by means of the estimated impulse response of the channel.

The areas drawn with broken lines in FIG. 2C illustrate the processing of the pilot part 274A included in the radio signal and the processing of the data part 274B included in the radio signal.

The Rake finger 270A, 270B, comprises a despreader 276A, 276L, connected to each antenna branch 232A, 232L and despreading the spread pilot part 274A included in the multipath propagated signal component, by using a known spreading code by a delay informed by the delay estimator 260.

Correspondingly, the Rake finger 270A, 270B comprises a despreader 276A, 276L, which is connected to each antenna branch 232A, 232L and despreads the spread data part 274B included in the multipath propagated signal component, by a known spreading code by a delay in-formed by the delay estimator 260. There are L despreaders for processing both the data part and the pilot part, i.e. two per each antenna branch 232A, 232L in each Rake finger 270A, 270B. In practice, when despreading, the data part or the pilot part of the signal component is multiplied by a complex conju-gate of the spreading code in the right phase.

As a whole, the situation is such that the delay estimator 260 allocates N Rake fingers 270A, 270B, for the best audible signal components. In each Rake finger 270A, 270B, L antenna branches 232A, 232L are processed. Both the pilot part of the radio signal and the data part of the radio signal are processed separately. The number N may vary depending on the cir-cumstances, or a threshold value may be set for the level of the multipath propagated signal component. If this threshold value is exceeded, said Rake finger 270A, 270B is notified and the reception continues. Consequently, the search for timing is a dynamic process, and so is the allocation of the Rake fingers 270A, 270B to be combined.

A weighting coefficient part 272 in the Rake finger 270A, 270B forms weighting coefficients which maximize the signal-to-interference-and-noise ratio (SINR) for each antenna branch 232A, 232L. This can be carried out for instance by multiplying an inverse matrix of a covariance matrix of an interference signal, consisting of interference and noise of the antenna branches 232A, 233L, by an estimated impulse response of the channel. The weighting coefficients are complex.

The pilot part 274A despread by the despreader 276A, 276L in each antenna branch 232A, 232L is multiplied by the obtained weighting coef-ficients by a multiplier 284A, 284L located in the Rake finger 270A, 270B. Correspondingly, the data part 274B despread by the despreader 276A, 276L in each antenna branch 232A, 232L is multiplied by the obtained weighting coef-ficients by a multiplier 284A, 284L. Accordingly, the signal components includ-ing the pilot part and the signal components including the data part are multiplied by the same weighting coefficients separately.

An antenna branch summer 278A, positioned last in the Rake finger 270A, 270B, combines the despread pilot parts 274A, received via the sepa-rate antenna branches 232A, 232L and multiplied by a weighting coefficient, to one pilot signal.

Correspondingly, an antenna branch summer 278B combines the despread data parts 274B, received via the separate antenna branches 232A, 232L and multiplied by a weighting coefficient, to one data signal.

The Rake receiver additionally comprises a Rake finger summer 280B combining the data signals of the Rake fingers 270A, 270B functioning by different delays to a sum data signal representing the received bits. The data bits are then brought according to FIG. 2A from block 228 to block 226 to be deinterleaved.

The receiver presented is suitable for use both at a base station and at user equipment. This means that both I/Q multiplexing and time multiplexing of data channel and control channel are possible.

Between the antenna branch summer 278A, 278B and the Rake finger summer 280A, 280B, there may be a real part 278A, 278B, removing from the combined signal of each antenna branch its imaginary part, because the imaginary part is an error term generated during channel estimation.

In a preferred embodiment, the Rake receiver comprises a Rake finger summer 280A combining the pilot signals of the Rake fingers 270A, 270B, functioning by different delays, to a sum pilot signal representing the received pilot bits. This sum pilot signal can be brought to an estimator 282 for the signal-to-inference ratio, estimating the signal-to-interference ratio of said channel. The power control of a closed loop can be controlled by the obtained signal-to-interference ratio of said channel. This is illustrated in block 282 of FIG. 2C by the text TPC (Transmission Power Control). The invention is implemented preferably by software, at least part of the functions included in block 228 being changed to software to be performed by a processor. However, the delay estimator 260, 290A requiring a high calculation capacity is preferably implemented as an Application Specific Integrated Circuit (ASIC). The other functions included in block 228 can also be implemented by device solutions offering the needed functionality, such as an ASIC or a discrete logic.

A method of calculating weighting coefficients maximizing the SINR is presented next, assuming that the impulse response h of the channel and the covariance matrix RUU of interference and noise are known. The method can be used both in the Rake fingers 270A, 270B and in the delay estimator 290A. Subsequently, a method of estimating h and $R_{uu}$ by means of known pilot bits included in a signal is presented. The presentation is a complex baseband signal model on symbol level for processing the signal. In the presentation, the bold face terms illustrate a vertical vector or a matrix. Let us assume. that N multipath propagated Signals Of Interest (SOI) are found on time axis by matched filters, and each signal component is received via L separate antennas. The L complex channel taps of the Nth multipath propagated signal component are indicated by vectors $h_n$ having a length L. The additive Multi Access Interference (MAI) caused by other users, multipath self-interference and noise are indicated by a vector $u_n$, which is modelled as an L-variate complex Gaussian distributed process with spatial possibly coloured covariance $R_{uu,n}=E[u_n u_n^H]$. The signal received from the L antennas is indicated by a vector $r_n$. An information symbol of the Mth user out of an alphabet of size M is indicated by the term $s_m$.

The Gaussian assumption for the despread MAI is valid for a great number of spreading factors having different lengths.

Subsequently, each symbol period is discretized into K samples, whereby the vector $r_n$ can be presented in the form:

$$r_n[k]=h_n s_m[k]+u_n[k], \ k=1,\ldots,K \tag{1}$$

By stacking each of the N vectors to vectors having a length LN, a more compact notation is obtained:

$$r[k]=h s_m[k]+u[k], \ k=1,\ldots,K \tag{2}$$

The Gaussian distributed interference variables $u_n[k]$ and $u[k]$ are mutually uncorrelated across sampling instants and also across the different multipath propagated components of SOI. Then:

$$R_{uu}[k] = E[u[k]u^H[k]] = diag(R_{uu,1}[k], \ldots, R_{uu,N}[k]) \quad (3)$$

Assuming that the symbols $s_m$ are equi-probable and the channel parameters h and the covariance matrix $R_{uu}[k]$ of interference and noise are both known, the optimal demodulation involves the maximization of the log likelihood function ($|\cdot|$ denotes determinant):

$$L(r, s_m) = \ln\left(\prod_{k=1}^{K} \frac{1}{\pi^{LN}|R_{uu}[k]|} \exp\{-u[k]R_{uu}^{-1}[k]u^H[k]\}\right) \quad (4)$$

$$= -\sum_{\lambda=1}^{K} (r[k] - hs_m[k])^H R_{uu}^{-1}[k](r[k] - hs_m[k]) + const_1$$

Assuming that the symbols have the same energy, formula 4 can be developed into the form:

$$L(r, s_m) = \sum_{k=1}^{K} 2\text{Re}\{r^H[k]R_{uu}^{-1}[k]hs_m[k]\} + const_2 \quad (5)$$

$$= 2\text{Re}\left\{\sum_{k=1}^{K}\left(\sum_{n=1}^{N} w_n^H[k]r_n[k]\right)s_m^*[k]\right\} + const_2$$

$$= 2\text{Re}\{s_m^H \cdot t\}$$

whereby the N weighting coefficients minimizing the interference are $w_n[k] = R_{uu,n}^{-1}[k]h_n$, and the vectors $s_m$ and t have a length K with elements $s_m[k]$, respectively $$\sum_{n=1}^{N} w_n^H[k]r_n[k].$$

Accordingly, the IRC Rake receiver presented earlier can be decomposed into N temporal Rake fingers, each of which performs spatial IRC on the L antenna inputs by using weighting coefficients $w_n[k] = R_{uu,n}^{-1}[k]h_n$. The outputs of the Rake fingers are summed, i.e, combined, and a correlation detector is applied to determine for the symbol $s_m$ a value enabling the largest symbol correlation metric.

If the multipath self-interference of SOI can be neglected, for instance when the processing gain is large enough, the $R_{uu,n}$ is essentially the same in all N fingers, which means that it needs to be estimated and inverted only once. When the interference covariance matrix is spatially white, i.e. $R_{uu,n} = Id$, IRC becomes MRC, because $w_n[k] = h_n$. Direct Matrix Inversion (DMI) of the matrix $R_{uu,n}$ can be avoided, if recursive algorithms, such as Least Mean Square (LMS) or Recursive Least Square (RLS), are used. Accordingly, the receiver can be constructed in such a way that the interference elimination method can be changed according to the circumstances between the MRC and IRC. When data transmission speeds are high, the interference is coloured, and therefore, IRC is used, and, respectively, MRC is used at low data transmission speeds. In principle, MRC is only one special case of IRC, which means that the method to be used can always be IRC.

Assuming that h and $R_{uu}$ are not known, an unstructured Maximum Likelihood ML channel estimation of vector h and an estimation of the covariance matrix $R_{uu}$ utilizing the performed channel estimation are presented next. As stated earlier, I/Q multiplexing is used in the uplink direction, the data channel being multiplexed to the branch I and the control channel to the branch Q. The control channel also comprises a previously known pilot part. Both channels can be separated from each other by despreading with orthogonal spreading codes. The symbol-level signal model is obtained from equation 1, by writing it separately for each part, I and Q, using BPSK symbols $s_m \in \{-1,1\}$. It is further assumed that the index k now refers to the bit index of the symbol sequence. K bits of DPCCH are collected into one slot.

Previously, the channel parameters h and the interference covariance $R_{uu}$ were assumed to be known. Now, it is assumed that no a priori information on either spatial structure is available, which means that the optimal channel estimates are created on the maximum likelihood principle. The vector $r[k]$, $k=1, \ldots, K$ and the pilot bits $s_p[k]$ of the DPCCH within one slot are used, by which ML estimates [$\hat{h}$, $\hat{R}_{uu}$] are generated, being the joint minimizers of the log likelihood function:

$$L(r, h, R_{uu}) = \ln\left(\prod_{k=1}^{K} \frac{1}{\pi^{LN}|R_{uu}[k]|} \exp\{-(r[k] - \quad (6)\right.$$

$$hs_p[k])^H R_{uu}^{-1}[k](r[k] - hs_p[k])\}\Big)$$

$$= -\ln|R_{uu}^{-1}| - trace\left\{R_{uu}\frac{1}{K}\sum_{k=1}^{K}(r[k] - hs_p[k])\right\} + const_1$$

This ML estimating problem is separable. When ML is given the estimate $\hat{h}$, the vector will be $\hat{R}_{uu}$:

$$\hat{R}_{uu} = \frac{1}{K}\sum_{k=1}^{K}\left(r[k] - \hat{h}s_p[k]\right)\left(r[k] - \hat{h}s_p[k]\right)^H \quad (7)$$

and the ML estimate $\hat{h}$ is obtained as the minimizer of the cost function ($|\cdot|$ denotes determinant):

$$F = \left|\frac{1}{K}\sum_{k=1}^{K}(r[k] - hs_p[k])(r[k] - hs_p[k])^H\right| \quad (8)$$

$$= \left|(h - \hat{r}_{sr}^H)(h - \hat{r}_{sr}^H)^H + \hat{R}_{rr} - \hat{r}_{sr}^H\hat{r}_{sr}\right|$$

where $$\hat{r}_{sr} = \frac{1}{K}\sum_{k=1}^{K} s_p[k]r^H[k], \quad \hat{R}_{rr} = \frac{1}{K}\sum_{k=1}^{K} r[k]r^H[k]$$

F is minimized for the choice:

$$h = \hat{r}_{sr}^H \quad (9)$$

Figure 2G:
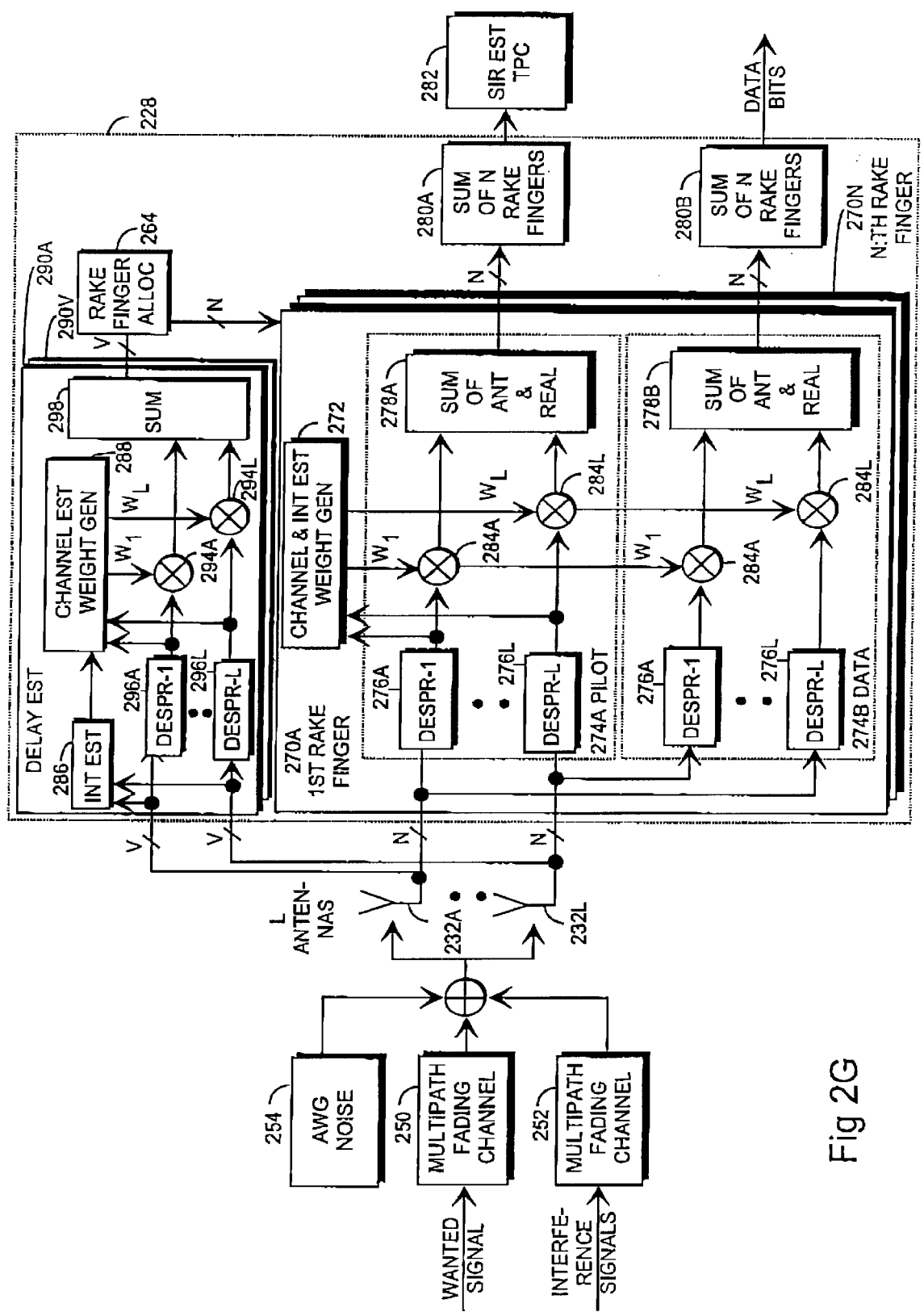
FIG. 2G illustrates the embodiment of the delay estimator presented in FIG. 2E as being included in the receiver presented in FIG. 2C.

Instead of estimating $R_{uu}$ from the despread signal, the wideband signal can be used for the covariance matrix estimation. In that approach we calculate $R_{rr}$ instead of $R_{uu}$ and use that term to suppress the interference. In the $R_{rr}$ estimation we have lots of samples and due to that the accuracy of the estimation can be increased. Also, in that approach, the covariance matrix needs to be calculated and inverted only once for all chip delay positions. So the computational load can be decreased. The $R_{uu}$ is the spatial correlation matrix of the interference plus noise and the $R_{rr}$ is the spatial correlation matrix of the signal plus interference plus noise. The $R_{uu}$ approach is described in FIG. 2D, and the $R_{rr}$ approach in FIG. 2E. FIG. 2E is otherwise the same as FIG. 2D but the interference estimator 286 estimates the $R_{rr}$ from the received wideband signal, and passes this information to the weighting coefficient part 288. FIG. 2G shows the embodiment of FIG. 2E included in the receiver of FIG. 2C.

A linear channel estimator based on pilot bits has been described above. It is obvious to one skilled in the art that known more developed channel estimation methods, such as methods utilizing a data channel as well, can be applied to the method of the invention.

In the radio system described, there may occur interference caused by the frequency band adjacent to the desired channel in some situations, this interference being known as Adjacent Channel Power (ACP). The adjacent frequency band may be the WCDMA frequency band adjacent to said operator, the WCDMA frequency band of another operator or a frequency band of some other system, for instance the GSM system. The problem may cause blocking in the cell in the uplink direction. For instance, let us assume that a high efficiency GSM transmitter causes ACP to a Rake receiver operating at a high data speed, i.e. at a low spreading ratio, on a 5-MHz frequency band, for instance. The ACP (as interference in general) must be above the noise level so that it can be eliminated. In accordance with the invention, an interference signal generated by the interference estimator 272 then comprises interference caused by the adjacent frequency band of the desired channel, i.e. adjacent channel power, the detrimental effect of which can thus be eliminated. A shrinking of the cell on account of ACP can thus be prevented.

Though the invention has been described above with reference to the example of the attached drawings, it is clear that the invention is not restricted to that, but can be modified in many ways within the scope of the inventive idea of the attached claims.

What is claimed is:

1. A Rake receiver comprising at least two antenna branches for receiving a radio signal, at least one Rake finger connected to the antenna branches for processing a multi-path propagated signal component of the radio signal, and a delay estimator connected to the antenna branches, the delay estimator comprising:
   means connected to each antenna branch for despreading a known pilot part included in the multipath propagated signal component by using a spreading code by a delay;
   a channel estimator for generating an impulse response of the channel of the multipath propagated signal component found by means of the known pilot part included in the radio signal of each antenna branch;
   an interference estimator for generating an interference signal included in the radio signal of each antenna branch;
   a weighting coefficient part for providing each antenna branch with weighting coefficients maximizing a signal-to-interference-and-noise ratio;
   a multiplier for multiplying the known pilot part by a weighting coefficient;
   an antenna branch summer for combining the despread and weighted pilot parts to a combined pilot signal; and
   the Rake receiver further comprises an allocator for selecting at least one delay on the basis of the combined pilot signal, by which delay the multipath propagated signal component is received, and allocating at least one Rake finger for processing the multipath propagated signal component with the selected delay.

2. The Rake receiver according to claim 1, wherein the interference estimator generates one interference signal that is used for all different delays.

3. The Rake receiver according to claim 1, wherein the interference estimator generates the interference signal for each delay.

4. The Rake receiver according to claim 3, wherein for each delay its own interference signal is used.

5. The Rake receiver according to claim 3, wherein an average interference signal is calculated using the interference signals of each delay, and the average interference signal is used for each delay.

6. The Rake receiver according to claim 1, wherein the interference estimator uses as an input the despread pilot part included in the multipath propagated signal component by using the spreading code by a delay.

7. The Rake receiver according to claim 1, wherein the interference estimator uses as an input the received radio signal.

8. The Rake receiver according to claim 1, wherein the interference estimator generates the interference signal by subtracting from the received radio signal a desired regenerated radio signal.

9. The Rake receiver according to claim 8, wherein the desired regenerated radio signal is obtained by means of the known pilot part and the impulse response of the channel.

10. The Rake receiver according to claim 8, wherein the desired regenerated radio signal is obtained by means of a decision feedback of detected data bits included in the despread multipath propagated signal component.

11. The Rake receiver according to claim 1, wherein the interference estimator generates the interference signal by using multi-user detection, whereby the signals of other users form the interference signal.

12. The Rake receiver according to claim 1, wherein the impulse response of the channel generated by the channel estimator is averaged coherently by a first filter structure connected to the channel estimator.

13. The Rake receiver according to claim 1, wherein the despread pilot part multiplied by the weighting coefficient is non-coherently filtered by a second filter structure connected between the multiplier and the antenna branch summer in each antenna branch.

14. The Rake receiver according to claim 1, wherein the combined pilot signal is averaged non-coherently by a third filter structure connected between the antenna branch summer and the allocator.

15. The Rake receiver according to claim 1, wherein the means for despreading is a matched filter for each antenna branch for performing a predetermined number of parallel correlation calculations for the received radio signal by different delays, whereby the pilot part included in the received radio signal is despread in correlation calculation by a spreading code at a predetermined delay.

16. The Rake receiver according to claim 1, wherein, to provide an antenna gain, the antenna branches form an antenna array, by which an antenna beam is formed in the desired direction by phasing separate antenna signals.

17. The Rake receiver according to claim 1, wherein the antenna branches are diversity branches.

18. The Rake receiver according to claim 17, wherein the antenna branches are antennas implemented by space diversity.

19. The Rake receiver according to claim 17, wherein the antenna branches are antennas implemented by polarization diversity.

20. The Rake receiver according to claim 1, wherein the channel estimator performs the channel estimation on an optimal Maximum Likelihood principle.

21. The Rake receiver according to claim 1, wherein weighting coefficients maximizing the signal-to-interference-and-noise ratio are formed for each antenna branch by multiplying an inverse matrix of a covariance matrix, generated of the interference signal of the antenna branches, by the estimated impulse response of the channel.

22. The Rake receiver according to claim 21, a channel estimate generated by an optimal Maximum Likelihood principle is utilized for estimating the covariance matrix generated of interference and noise.

23. The Rake receiver according to claim 1, wherein the interference signal generated by the interference estimator comprises interference caused by the adjacent frequency band of the desired channel, i.e. adjacent channel power.

24. The Rake receiver according to claim 1, wherein the means for despreading is a despreader for each antenna branch for performing a predetermined number of parallel correlation calculations for the received radio signal by different delays, whereby the pilot part included in the received radio signal is despread in correlation calculation by a spreading code at a predetermined delay.

* * * * *